Patented May 5, 1942

2,281,624

UNITED STATES PATENT OFFICE 2,281,624

WATER-SOLUBLE MOTHPROOFING AGENTS

Heribert Schüssler, Cologne, and Walther Retter, Cologne-Deutz, Germany, assignors, by mesne assignments, to General Aniline & Film Corporation, New York, N. Y., a corporation of Delaware No Drawing. Application January 11, 1939, Serial No. 250,336. In Germany January 15, 1938

15 Claims. (Cl. 167—37)

The present invention relates to water-soluble moth-proofing agents.

Hitherto water-soluble moth-proofing agents have been manufactured by introducing sulfo or carboxylic acid groups into the aromatic nucleus of compounds being effective but insoluble in water and having phenolic hydroxy groups. Another way was by using for the synthesis such starting materials as contain sulfo or carboxylic acid groups in an aromatic nucleus. Water-soluble moth-proofing agents of this kind, however, have the disadvantage that they are less effective when compared with the corresponding compounds bearing no sulfo or carboxylic acid groups, as by the introduction of such groups for rendering the moth-proofing agents water-soluble, their effectiveness is more or less diminished.

We have found that the acid mineral acid esters of moth-proofing agents having at least one free phenolic hydroxy group but being insoluble in water represent valuable water-soluble moth-proofing agents. Obviously the same applies to the corresponding water-soluble salts of such acid mineral acid esters as, for instance, the alkali metal salts. Therefore, the appended claims are intended to cover the free acid esters as well as the water-soluble salts. The great advantage of the acid mineral acid esters consists in that they possess an increased effectiveness when compared with water-soluble moth-proofing agents, having sulfo or carboxylic acid groups in an aromatic nucleus. A further and important advantage is that by using hot acid baths in the treatment of materials with our acid mineral acid esters, the acid radical is split off, thus the starting moth-proofing agent reforming. In this way the materials to be protected can be impregnated very fast to water and washing from an aqueous solution with a moth-proofing agent being insoluble in water.

Preferably we make the acid sulfuric and phosphoric acid esters. The esters are prepared by causing chlorosulfonic acid to react with a moth-proofing agent of the character as defined above in the presence of a tertiary base, or by treating with phosphorus oxychloride in the presence of an alkali. As starting materials we employ moth-proofing agents of all kind, provided that they are insoluble in water and contain at least one free phenolic hydroxy group. More particularly we start from halogenated aromatic compounds having more than one nucleus, the nuclei of which may be condensed together or may be linked with a central atom, for instance a carbon or a sulfur atom. Compounds of this character are, for instance, naphthols, compounds derived from diphenyl, diphenylmethan, triphenylmethan, as for example, 1-methyl-3.6-dibromo-β-naphthol,
1.3.6-tribromo-2-naphthol,
2.4-dibromo-1-naphthol,
1-chloro-6-bromo-2-naphthol,
Dibromo-1-chloro-2-naphthol,
6-bromo-1-methyl-2-naphthol,
2.2′-dihydroxy-3.3′.5.5′-tetrachloro-diphenyl,
2.2′-dihydroxy-3.3′.5.5′-tetrabromo-diphenyl,
4.4′-dihydroxy-3.3′-dichloro-diphenyl,
2.2′-dihydroxy-3.3′-tetramethyl-diamido-5.5′-dichloro-diphenyl-methan,
2.2′-dihydroxy-5.5′-dichloro-diphenyl-methan,
2.2′-dihydroxy-3.3′-dimethyl- 5.5′ - dichloro - diphenyl-methan,
2.2′-dihydroxy-4.4′-dichloro-diphenyl-methan,
2.2′-dihydroxy-3.3′- dimethyl - 4.4′ - dichloro-diphenyl-methan,
2.2′-dihydroxy-4.4′-dimethyl- 5.5′ - dichloro - diphenyl-methan,
2.2′-dihydroxy - 3.3′.5.5′ - tetrachloro - diphenyl - methan,
2.2′.5.5′-tetrachloro - 4.4′ - dihydroxy - diphenyl - methan,
2.2′-dihydroxy-3.3′.5.5′.6.6′-hexachloro-diphenyl - methan,
2.2′-dihydroxy-5.5′-dichloro-triphenyl-methan,
2.2′ - dihydroxy - 5.5′.2″ - trichloro - triphenyl - methan,
2.2′-dihydroxy-3.3′-trimethyl- 5.5′.2″ - trichloro - triphenyl-methan,
2.2′ - dihydroxy - 5.5′.4″ - trichloro - triphenyl - methan,
2.2′-dihydroxy-3.3′.5.5′.2″.6″-hexachloro-triphenyl-methan,
2.2′-dihydroxy-3.3′.5.5′.2″.4″-hexachloro-triphenyl-methan,
2.2′-dihydroxy-3.3′.5.5′.3″.4″-hexachloro-triphenyl-methan,
2.2′-dihydroxy-3.3′-dimethyl-5.5′.2″.4″.5″-pentachloro-triphenyl-methan,
2-hydroxy-3.5.3′.5′-tetrachloro-2′.2″.-sulfon - triphenyl-methan,
2.2′.3″-trihydroxy-3.3′.5.5′.2″.4″.6″- heptachloro - triphenyl-methan,
3.2′-dihydroxy-2.4.6.3′.5′-pentachloro- 4″ - nitro - triphenyl-methan,
2-hydroxy-3.5.3′.5′.4″-pentachloro- 2′.2″ - sulfon - triphenyl-methan,
3.2′-dihydroxy-2.4.6.3′.5′-pentachloro- 3″ - nitro - triphenyl-methan, 2.2'-dihydroxy-3.3'.5.5'.4''-pentachloro-triphenyl-methan,
2.2'-dihydroxy-3.3'.5.5'.2''-pentachloro-triphenyl-methan,
2.2'-dihydroxy-3.3'.5.5'.2''-pentachloro-6''-fluoro-triphenyl-methan,
2.2'-dihydroxy-3.3'.5.5'-tetrachloro-2''.6''-difluoro-triphenyl-methan.
2.2'-dihydroxy-3.3'.5.5'.2''.4''.5''.-heptachloro-triphenyl-methan.

Our new compounds may be employed in the usual manner in aqueous solution at an elevated temperature and, if desired, in the presence of acids, as stated above.

The following examples illustrate the invention without, however, restricting it thereto, the parts being by weight:

Example 1

Into 50 parts of pyridine are introduced 25 parts of chlorosulfonic acid while cooling, then 14.2 parts of 2.2'-dihydroxy-3.3'.5.5'-tetrachloro-diphenyl are added and the temperature is kept at 40–50° for 6–8 hours while stirring. After cooling the mixture is neutralized with 35 parts of sodium carbonate and dissolved in some water, the pyridine being blown off with water vapor. From the usually brownish-colored solution the sodium salt of the acid di-ester of the above-named dihydroxy-diphenyl-derivate is obtained by salting out. It represents a colorless, water-soluble powder and excellently protects wool to the attack of moths used in an acid dyeing bath in the proportion 2–3:100 calculated on the weight of the material.

Example 2

Into 100 parts of pyridine are dropped 50 parts of chlorosulfonic acid while cooling, then 50 parts of 2.2'-dihydroxy-5.5'-dichloro-diphenyl-methane are added. After a six hours reaction at a temperature of 40–50° 120 parts of potassium carbonate dissolved in some water are added, the pyridine being blown off with water vapor. The working up is performed as described in Example 1. The potassium salt of the sulfuric acid esters is obtained in form of a colorless powder easily soluble in water.

Woolen tissue treated with 3% of this salt (calculated on the weight of the material to be proofed) in an acid dyeing bath for one hour at a temperature of 90–95° is protected to the attack of moths.

Example 3

When causing to react 2 mols of phosphorus oxychloride with 1 mol of 2.2'-dihydroxy-3.3'.6.6'-tetrachloro-diphenyl-methan at room temperature and salting out the sodium salt of the phosphoric acid ester of the above-named compounds is obtained in form of a colorless, water-soluble powder.

When cashmere is treated with 3% of this salt (calculated on the weight of the material to be proofed) in an acid, boiling dyeing bath it is protected to the attack of moths.

Example 4

When causing to react 2 mols of chlorosulfonic acid with 1 mol of 2.2'-dihydroxy-3.3'.5.5'.2''.4''.5''-heptachloro-triphenyl-methan according to Example 1 in the presence of pyridine, neutralizing and removing the pyridine, the sodium salt of the sulfuric acid ester of the above-named compound is obtained in form of a colorless, water-soluble powder.

Woolen yarn treated with ½–1% of this compound (calculated on the weight of the material to be proofed) in an acid or neutral dyeing bath at a temperature of 95° for one hour, is completely protected to the attack of moths.

In the same manner woolen yarn may be protected to the attack of moths by treating with the water-soluble sulfuric acid esters (with the water-soluble salts of them respectively) of the following hydroxy-triphenyl-methan compounds:

3.5.3'.5'.4''-pentachloro-2.2'-dihydroxy-triphenyl-methan;
3.5.3'.5'.2''-pentachloro-2.2'-dihydroxy-triphenyl-methan;
5.5'.2''-trichloro-3.3'-dimethyl-2.2'-dihydroxy-triphenyl-methan;
3.5.3'.5'.2''.4''-hexachloro-2.2'-dihydroxy-triphenyl-methan;
3.5.3'.5'.4''-pentachloro-2.2'-dihydroxy-triphenyl-methan-2''.6''-sulfon.

Example 5

Mixed tissue of wool and viscose cellulose fiber is treated with 1% (calculated on the weight of the material to be proofed) of the sodium salt of the sulfuric acid ester of heptachloro-dihydroxy-triphenyl-methan in aqueous solution (1:100) for one hour while boiling with the addition of 10% of Glauber's salt. The material thus treated is protected to the attack of moths and may be washed without affecting this quality.

We claim:

1. Water-soluble moth-proofing agents comprising acid mineral acid esters of water-insoluble moth-proofing agents containing at least two free phenolic hydroxy groups which are esterified by an acid selected from the group consisting of phosphoric and sulfuric acid.

2. Water-soluble moth-proofing agents comprising acid sulfuric acid esters of water-insoluble moth-proofing agents containing at least two free phenolic hydroxy groups which are esterified by sulfuric acid.

3. Water-soluble moth-proofing agents comprising acid phosphoric acid esters of water-insoluble moth-proofing agents containing at least two free phenolic hydroxy groups which are esterified by phosphoric acid.

4. Water-soluble moth-proofing agents comprising acid mineral acid esters of water-insoluble moth-proofing agents derived from the diphenyl-methane series and containing at least two free phenolic hydroxy groups which are esterified by an acid selected from the group consisting of phosphoric and sulfuric acids.

5. Water-soluble moth-proofing agents comprising acid mineral acid esters of water-insoluble moth-proofing agents derived from the triphenyl-methane series and containing at least two free phenolic hydroxy groups which are esterified by an acid selected from the group consisting of phosphoric and sulfuric acids.

6. Water-soluble moth-proofing agents comprising acid sulfuric acid esters of water-insoluble moth-proofing agents derived from the triphenyl-methane series and containing at least two free phenolic hydroxy groups which are esterified by sulfuric acid.

7. Water-soluble moth-proofing agents comprising acid phosphoric acid esters of water-insoluble moth-proofing agents derived from the triphenyl-methane series and containing at least two free phenolic hydroxy groups which are esterified by phosphoric acid.

8. Water-soluble moth-proofing agents comprising acid mineral acid esters of water-insoluble moth-proofing agents derived from the triphenyl-methane series and containing at least 4 halogen atoms and at least two free phenolic hydroxy groups which are esterified by an acid selected from the group consisting of phosphoric and sulfuric acids.

9. Water-soluble moth-proofing agents comprising acid mineral acid esters of water-insoluble moth-proofing agents derived from the triphenyl-methane series and containing at least 4 chlorine atoms and at least two free phenolic hydroxy groups which are esterified by an acid selected from the group consisting of phosphoric and sulfuric acids.

10. Water-soluble moth-proofing agents comprising acid sulfuric acid esters of water-insoluble moth-proofing agents derived from the triphenyl-methane series and containing at least 4 chlorine atoms and at least two free phenolic hydroxy groups which are esterified by sulfuric acid.

11. Water-soluble moth-proofing agents comprising acid phosphoric acid esters of water-insoluble moth-proofing agents derived from the triphenyl-methane series and containing at least 4 chlorine atoms and at least two free phenolic hydroxy groups which are esterified by phosphoric acid.

12. Water-soluble moth-proofing agents comprising acid mineral acid esters of water-insoluble moth-proofing agents derived from the triphenyl-methane series and containing two free phenolic hydroxy groups which are esterified by an acid selected from the group consisting of phosphoric and sulfuric acids.

13. Water-soluble moth-proofing agents comprising acid sulfuric acid esters of water-insoluble moth-proofing agents derived from the triphenyl methane series and containing two free phenolic hydroxy groups which are esterified by sulfuric acid.

14. Water-soluble moth-proofing agents comprising acid phosphoric acid esters of water-insoluble moth-proofing agents derived from the triphenyl methane series and containing two free hydroxy groups which are esterified by phosphoric acid.

15. A water-soluble moth-proofing agent comprising the acid sulfuric acid diester of 2.2'.dihydroxy - 3.3'.5.5'.2''.4''.5'' - heptachloro- triphenyl methane.

HERIBERT SCHÜSSLER.
WALTHER RETTER.

CERTIFICATE OF CORRECTION.

Patent No. 2,281,624. May 5, 1942.

HERIBERT SCHÜSSLER, ET AL.

It is hereby certified that error appears in the printed specification of the above numbered patent requiring correction as follows: Page 3, second column, line 17, claim 14, after the word "free" insert --phenolic--; and that the said Letters Patent should be read with this correction therein that the same may conform to the record of the case in the Patent Office.

Signed and sealed this 11th day of August, A. D. 1942.

(Seal)

Henry Van Arsdale,
Acting Commissioner of Patents.